United States Patent
Tse et al.

(10) Patent No.: US 7,899,907 B2
(45) Date of Patent: Mar. 1, 2011

(54) ACCESS AND SYNCHRONIZATION WITH ENTERPRISE APPLICATIONS USING REMOTE HOSTED SOLUTION

(75) Inventors: Kwong Ming Tse, Foster City, CA (US); David Louie, Ann Arbor, MI (US); Ching Kai Huang, San Jose, CA (US); Jimin Li, Hayward, CA (US); Wenxin Li, Foster City, CA (US); Yong Lu, Mountain View, CA (US); Tien Huu Nguyen, San Jose, CA (US); George Eichholzer, Toronto (CA)

(73) Assignee: Siebel Systems, Inc., San Mateo, CA (US)

( * ) Notice: Subject to any disclaimer, the term of this patent is extended or adjusted under 35 U.S.C. 154(b) by 196 days.

(21) Appl. No.: 11/026,565

(22) Filed: Dec. 30, 2004

(65) Prior Publication Data
US 2006/0015619 A1    Jan. 19, 2006

Related U.S. Application Data

(60) Provisional application No. 60/584,384, filed on Jun. 30, 2004.

(51) Int. Cl.
G06F 15/16    (2006.01)

(52) U.S. Cl. ......... 709/225; 709/224; 709/228; 370/231; 370/229

(58) Field of Classification Search .................. 709/203, 709/217, 230, 224, 227, 229, 218; 705/30, 705/40; 707/10, 203, 200; 719/330
See application file for complete search history.

(56) References Cited

U.S. PATENT DOCUMENTS

| | | | |
|---|---|---|---|
| 6,026,413 A * | 2/2000 | Challenger et al. | 707/202 |
| 6,199,096 B1 * | 3/2001 | Mirashrafi et al. | 709/202 |
| 6,212,192 B1 * | 4/2001 | Mirashrafi et al. | 370/401 |
| 6,253,228 B1 * | 6/2001 | Ferris et al. | 709/203 |
| 6,317,794 B1 * | 11/2001 | Papierniak et al. | 709/229 |
| 6,535,892 B1 * | 3/2003 | LaRue et al. | 707/203 |
| 6,553,406 B1 | 4/2003 | Berger et al. | 709/203 |
| 6,625,581 B1 * | 9/2003 | Perkowski | 705/27 |
| 6,633,910 B1 * | 10/2003 | Rajan et al. | 709/224 |
| 6,763,226 B1 * | 7/2004 | McZeal, Jr. | 455/90.2 |
| 6,882,986 B1 * | 4/2005 | Heinemann et al. | 705/40 |
| 6,947,967 B2 * | 9/2005 | Ferris et al. | 709/203 |
| 6,981,062 B2 * | 12/2005 | Suryanarayana | 709/248 |
| 7,228,341 B2 * | 6/2007 | Giacalone, Jr. | 709/218 |
| 7,228,353 B1 * | 6/2007 | Franceschelli et al. | 709/229 |
| 2002/0010739 A1 * | 1/2002 | Ferris et al. | 709/203 |
| 2002/0124100 A1 * | 9/2002 | Adams | 709/232 |
| 2003/0078973 A1 * | 4/2003 | Przekop et al. | 709/204 |
| 2003/0139975 A1 * | 7/2003 | Perkowski | 705/26 |
| 2005/0050229 A1 * | 3/2005 | Comeau et al. | 709/248 |
| 2005/0202392 A1 * | 9/2005 | Allen et al. | 434/362 |
| 2007/0118590 A1 * | 5/2007 | Giacalone | 709/201 |

* cited by examiner

*Primary Examiner* — Khanh Q Dinh
(74) *Attorney, Agent, or Firm* — Campbell Stephenson LLP

(57) ABSTRACT

A hosting center that is remote from a plurality of customer environments is provided so that users can interact with data from the user's selected customer environment. The data interaction includes bi-directional synchronization of data between that of the hosting center and that of the user's selected customer environment.

22 Claims, 3 Drawing Sheets

ACCESS AND SYNCHRONIZATION WITH ENTERPRISE APPLICATIONS USING REMOTE HOSTED SOLUTION

CROSS REFERENCE TO RELATED APPLICATIONS

This application claims the benefit of U.S. Provisional Patent Application No. 60/584,384 filed Jun. 30, 2004, entitled, "Packaged Integration, Such As Packaged Integration For Customer Relationship Management Software Components," by Kwong-Ming Tse and David Louie, and which is hereby incorporated by reference in its entirety.

TECHNICAL FIELD

An On-Demand access for accessing and synchronizing with a remote enterprise application system is described.

BACKGROUND

A large company may employ various systems to manage aspects of human resources and enterprise resources. The various systems can include Human Resource Management systems, Employee Relationship Management systems, Enterprise Resources Planning systems, supply chain management and warehouse management, and custom applications for the purpose of sharing data. For purposes of simplicity, such systems are herein referred to as enterprise application systems or enterprise system.

It is not unusual for large companies to have satellite offices in several parts of the world. To deploy the company's enterprise application system in each of the company's satellite offices may prove to be very expensive and inefficient. For example, it would be wasteful to deploy the company's enterprise application system and build the IT infrastructure to support such a system in a small satellite sales office. Further, maintenance, and upgrades to the enterprise application system in the various satellite offices add considerable expense. On the other hand, not to deploy the company's enterprise application system in the satellite offices would be to unwisely hamper the working ability of the employees working out of the satellite offices. For example, employees in the various sales offices in the Company may need to track leads and opportunities and expect such data to be synchronized with the Company's enterprise applications in the enterprise application system.

Thus, what is needed is a cost-effective way for users of enterprise applications in an enterprise application system to synchronize application data with the enterprise applications in the enterprise application system.

DETAILED DESCRIPTION

Within a company organization, there may be pockets of users who do not have access to their company's enterprise application system. According to certain embodiments, a hosted solution can be provided to such users so that the users might use existing application data or create new application data while having such data be synchronized with the company's enterprise application system. Such a hosted solution is herein referred to as an OnDemand system. The synchronization of data of the hosting center with corresponding data in the one or more customer environments is herein referred to as the OnDemand integration application process (IAP).

According to certain embodiments, a hosting service can be provided to a plurality of companies that need such services. The application system of each company of the plurality of companies is referred to herein as the customer environment. According to one aspect, a hosting center that is remote from the customer environments is provided so that users can interact with data from the user's selected customer environment.

According to another aspect, a user can access the hosting center using a web browser. The hosting center is adapted to synchronize data used by the user with the corresponding data in one more selected customer environments. For example, a user from Company A may update data that should be synchronized with corresponding data in Company A's enterprise application system. Such data may also need to be synchronized with data in enterprise application systems of Company C and Company D who are business partners of Company A. Thus, the hosting center is automatically adapted to synchronize data across multiple customer environments. According to another aspect, the synchronization is bidirectional between the hosting center and any given customer environment. According to one aspect, the hosting center is on a separate intranet than each of the plurality of customer environments. Each of the customer environments is within their respective company's intranet.

According to certain embodiments, the hosting center automatically converts data that is received from users to a standards independent format that is then transported by a connectivity server, such as a B2B server, to the one or more customer environments where the data is to be synchronized with corresponding data in the customer environment. According to one aspect, the synchronization process includes converting the data from the standards independent format into a format that is specific to the relevant application in the customer environment.

According to yet another aspect, the data transport between the hosting center and each of the plurality of customer environments is performed using a secure connection, such as https. Further, various authentication mechanisms, such as digital certificates, can be used. The connectivity servers in the embodiments support encryption and decryption mechanisms.

Figure 1:
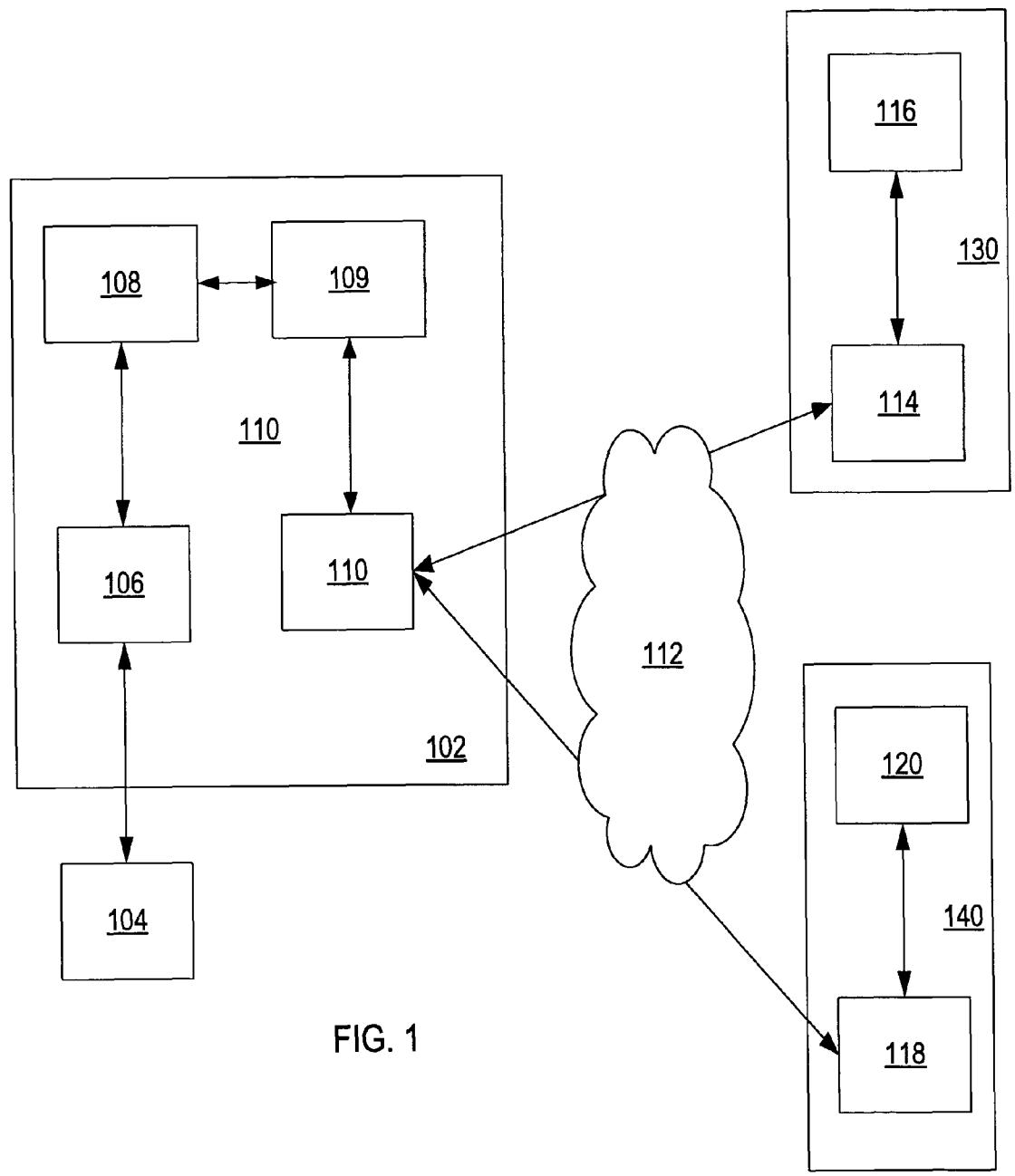
FIG. 1 is a high-level diagram of an architecture for an OnDemand integration application process.

FIG. 1 is a high-level diagram of an architecture for an OnDemand integration application process. FIG. 1 shows a user's web browser 104 for accessing an onDemand hosting center 102 which in turn is operatively connected to a plurality of customer environments (OnPremise systems) of which two customer environments 130 and 140 are shown.

OnDemand hosting center 102 comprises a web application server 106 that is operatively connected to an object manager application server 108. Object manager server 108 is operatively connected to a persistent queue 109 which in turn is operatively connected to a connectivity server 110. Customer environment 130 or OnPremise system 130 comprises a connectivity sever 114 and one or more application servers such as application server 116. Similarly, customer environment 140 or OnPremise system 140 comprises a connectivity sever 118 and one or more application servers such as application server 120. Application servers 116 and 120 may be servers for enterprise applications or legacy applications. Connectivity server 110 communicates with connectivity severs 114 and 118 through Internet 112.

Figure 2:
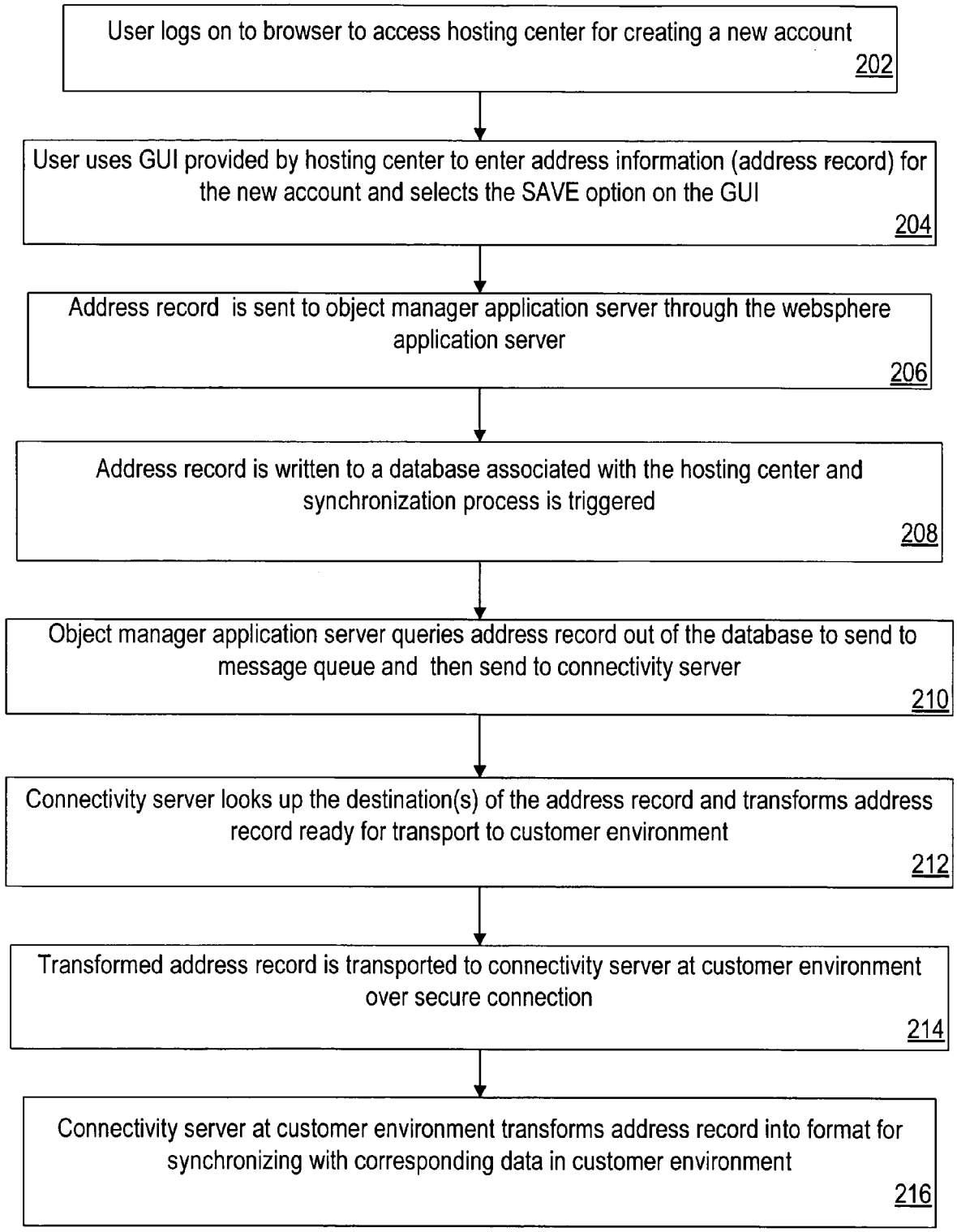
FIG. 2 is a flowchart that illustrates some high-level aspects of a workflow between a hosting center and the customer environments, according to certain embodiments.

FIG. 2 is a flowchart that illustrates some high-level aspects of a workflow between a hosting center and the customer environments, according to certain embodiments. For purposes of explanation, assume that Company X has a sales force located at a satellite office that is not equipped with Company X's enterprise application system. Further, assume that a sales representative ("user") in the satellite office wishes to create a new account. To create a new account, address information is entered in an address record. Such an address record needs to be synchronized with the address record in the Account management application in Company X's OnPremise enterprise application system. Address record is merely an example. The type of data that needs to be synchronized with the Enterprise system would depend on the specific application and the business goals that the user is attempting to achieve. Address record and the Account management application are merely examples. FIG. 2 is herein described with reference to FIG. 1.

At block 202, the user in Company X's satellite office logs on to a browser, such as browser 104, to access a hosting center, such as hosting center 102 of FIG. 1. The OnDemand hosting service provides the user with an appropriate GUI so that the user can insert, update or delete data. For example, at block 204, the user uses the GUI to enter address information, thereby creating an address record for the new account and then selects the SAVE option when the user has completed the entry.

At block 206, the address record is sent to the OnDemand object manager application server, such as object manager application server 108, through a web server. Any appropriate webserver may be used and the type of webserver can vary from implementation to implementation. One non-limiting example of a suitable web server is IBM's HTTP application server.

At block 208, the inserted address record is written to a database that is associated with the hosting center and a synchronization process is triggered by the object manager application server. The synchronization process begins at block 210 when object manager application server queries the address record out from the hosting center database. The address record is then sent to a persistent message queue, such as persistent queue 109 of FIG. 1. Any suitable persistent message queue may be used. One non-limiting example of a suitable persistent queue is the persistent queue in IBM's MQSeries transport service mechanism. The data posted by the object manager in the persistent queue is also referred to herein as OnDemand messages. Similarly, the data received by the object manager from the persistent queue is also referred to herein as OnDemand messages.

Next, the address record is sent to hosting center's connectivity server, such as connectivity server 110 of FIG. 1. A non-limiting example of a connectivity server is a B2B server.

At block 212, a business integration component of the connectivity server looks up the destination of the address record by examining a unique id of the destination company, in this case, Company X. An example of such a business integration component is IBM's WBIC (websphere business integration connect). One non-limiting example of a unique company id that may be used is the company DUNS number provided by Dun & Bradstreet. Further, the address record is transformed into a B2B standard independent format. One non-limiting example of a B2B standard independent format is an SPBI object. SPBI is a partner business interface made by Siebel. However, any suitable B2B standard independent format may be used. For example, the format can be any format that complies with RosettaNet communication protocol or AS/2 communication protocol, or any protocol for communication between connectivity servers.

According to certain other embodiments, a standard integration server may be used for determining the destination company for the inserted record as well as for converting the inserted record into a standard independent format ready for transport. Non-limiting examples of standard integration servers are IBM, Tibco and webMethods servers. The integration server will then send the transformed record to the hosting center B2B server.

At block 214, the host center B2B server then transports the transformed address record to the respective B2B servers in the destination customer environments (OnPremise systems) over a secure connection, according to certain embodiments. Referring to FIG. 1, assume that the transformed data is destined for customer environment 130 and customer environment 140. To explain, assume that the address record inserted by the user needs to be synchronized with the enterprise application of Company X as well as Company Y, where Company Y is a business partner of Company X. Depending on the business logic for the particular application, the transformed data may need to go to only one customer environment or to multiple customer environments. A secure connection over the Internet, such as https, may be used. In addition, the connectivity servers (B2B server), both at the hosting center and at each of the customer environments may be equipped with authentication mechanisms to authenticate the user. A non-limiting example of an authentication mechanism includes the use of digital certificates. Further, the connectivity servers may be equipped with encryption and decryption mechanisms for encrypting data before sending the data through the internet and for decrypting the data at the destination connectivity server.

At block 216, the connectivity server at the customer environment, such as connectivity servers 118 or 114 of FIG. 1 transforms the B2B standard independent formatted address record to a format specific to the Account application in the customer environment. The Account application in the customer environment may be part of an enterprise application system or it may be a legacy application. In the case of an enterprise application system, the address record may be formatted to an Account common object, which can then be synchronized with various application data in the customer environment enterprise application system.

Figure 3:
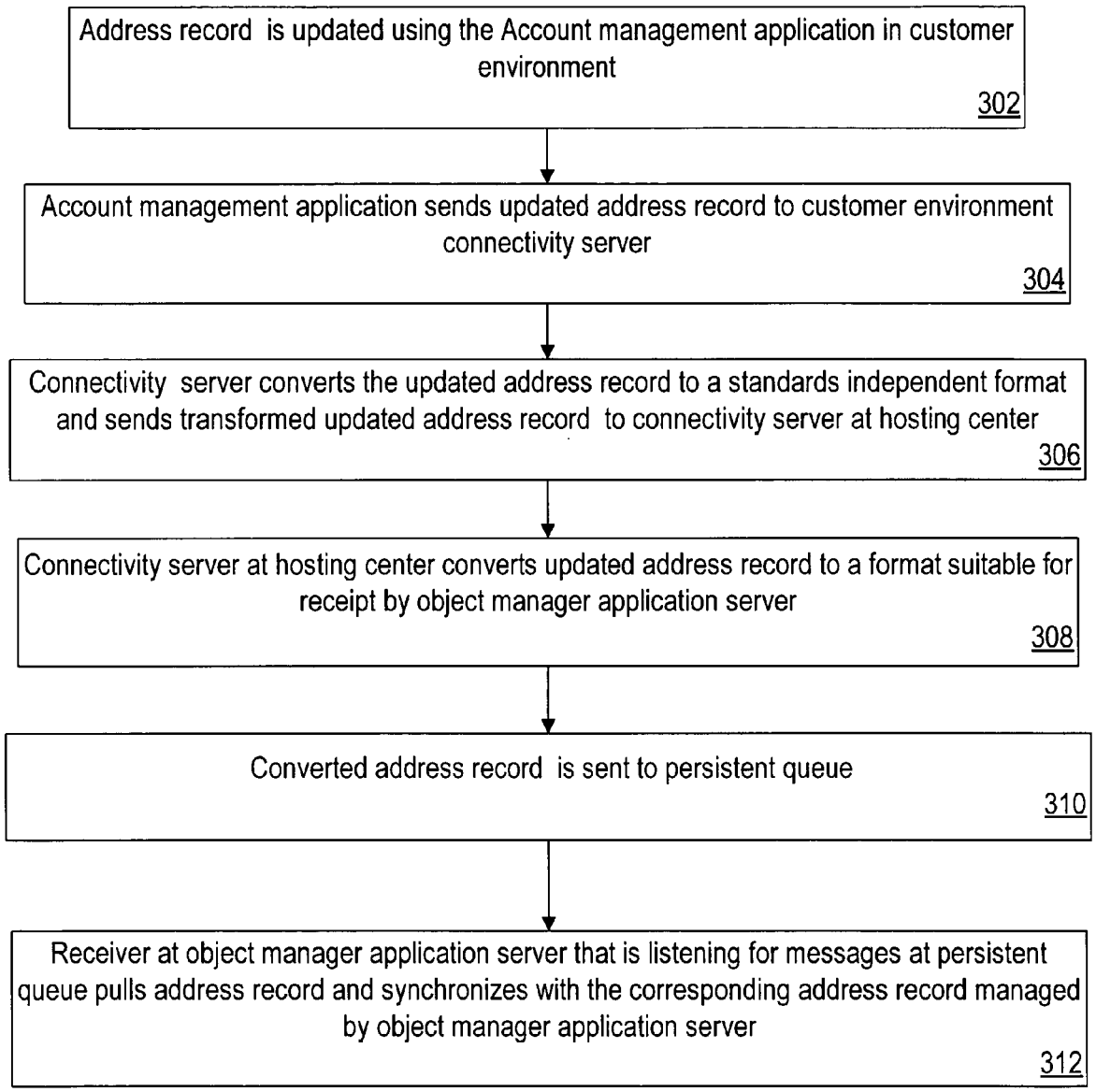
FIG. 3 is a flowchart that illustrates some high-level aspects of a workflow when data flows from customer environment to the hosting center, according to certain embodiments

FIG. 3 is a flowchart that illustrates some high-level aspects of a workflow when data flows from the customer environment to the hosting center, according to certain embodiments. For simplicity, FIG. 3 is described using the address record example of FIG. 2. The type of data that needs to be synchronized would depend on the specific application and the business goal that one is attempting to achieve. Address record and the Account management application are merely examples.

At block 302, the address record is updated at some later date in the customer environment.

At block 304, the account management application in the customer environment sends the updated address to the customer environment connectivity server.

At block 306, the connectivity server at the customer environment converts the updated address record to a connectivity server standards independent format and sends the transformed updated address record to the connectivity server at hosting center through the Internet using a secure connection.

At block 308, the connectivity server at the hosting center converts the updated address record to a format suitable for receipt by the object manager application server at the hosting center.

At block 310, the converted address record is sent to the persistent queue at the hosting center. At block 312, a receiver at object manager application server that is listening for messages at the persistent queue pulls the address record for synchronizing with the corresponding address record managed by the object manager application server.

Role of the OnDemand Object Manager

When data is flowing from the OnDemand hosting center, the role of the OnDemand Object Manager is to invoke an integration application process (IAP) to start the synchronization process (also referred to herein as an OnDemand workflow). For example, the IAP is invoked by inputting a row id to the relevant workflow. With such a Row Id, the object-specific application service interface (ASI) is invoked. The output of the ASI is a complete OnDemand Message containing all relevant fields for the object. All Customers (users) will be invoking the same workflow. Organization data will be included in the OnDemand Message, so the routing mechanism of the connectivity server or the integration server will know to which customer environment the OnDemand Message is to be routed.

When data is flowing to the OnDemand hosting center, an inbound workflow is triggered when an OnDemand Message is received as input. The workflow invokes the OnDemand ASI, which is a wrapper around an enterprise application integration (EAI) business service. The EAI business service can perform the operations "Insert", "Update", or "Insert and Updated".

Transport Mechanism—MQSeries Transport

For outbound communication, the OnDemand MQSeries Transport Business Service is invoked through an OnDemand workflow. An OnDemand workflow is invoked when a row id is provided as input. The OnDemand object-specific ASI is then invoked, and a transport business service is called. Input parameters to the MQSeries Transport Service include Queue Manager Name and Queue Name. If the MQSeries Server is on the same server as the OnDemand Object Manager, then the MQSeries Transport Service can be used. If MQSeries Server is on a different machine, then the MQSeries Application Messaging Interface (AMI) Client Transport Service must be used.

For communication inbound to the OnDemand system, the MQSeries server receiver component is configured to listen on a particular queue and post messages to the inbound workflow of the OnDemand object manager. Input to the workflow will be the body of the queue message. For the MQSeries server receiver component to work, the MQSeries server must reside on the same machine as the OnDemand Object Manager. The MQSeries server receiver component can be a stand-alone server component that can be started with the administrator's username and password that are entered into the OnDemand server manager.

Organization and Visibility Issues

An OnDemand user is expected to be assigned to one organization. This organization should exist in the customer environment system as well. When a message (record) is initiated from OnDemand and eventually reaches the customer environment system, the record should be created in the customer environment system with the same organization. Organizations will be referenced using either Organization Name or Organization DUNS Number. All OnDemand ASI's will have the organization information exposed. Further, on a case by case basis, the owner of the record may be exposed. It is up to a customer to determine how to transform the owner field of a record. The customer may choose to create a user with the same username in OnDemand and in the customer environment system so that the owner of a record may be directly mapped.

For inbound communication into the OnDemand server from the customer environment via the integration server or the integration component of the B2B server, an administrative user is used. This administrative user creates records on behalf of the customer. When a customer triggers an integration application process from the customer's enterprise application system, the request will transform through the integration server or integration component of the B2B server in the customer system and eventually reach the OnDemand server. The identity of customer organization will be imbedded in the message (record), so that, when the administrative user creates the record, the administrative user can create the record under the correct organization.

Record Assignment

For inbound communication into the OnDemand system, when records reach OnDemand system, the records will include information on the organization, but the records may or may not have an owner identified. When an owner is specified on an inbound message, it is assumed that the specified owner is a valid user in the OnDemand system. When no owner is specified on an inbound message, the default owner of the organization is used as the owner of record, for example.

OnDemand Host Administration

According to certain embodiments, not all IAP's are triggered automatically. According to certain embodiments, the OnDemand host administrator is provided a suitable mechanism to turn on specific IAP's that the customer has selected.

OnDemand Company Administration View

In the OnDemand Administration UI, there is a view that lists the participating companies. An OnDemand Host Administrator can use this view to modify licensing data or create users for a company.

OnDemand Company Administration View—Company DUNS Number

The Company Administration View includes a field for the Company DUNS Number. The Company DUNS Number is used by the B2B Server to route requests to the appropriate customer environment. The DUNS Number is also used for inbound requests to the OnDemand system. The Company is referenced by DUNS Number instead of Company Name or Company Row Id.

Addition of LOV for IAP Names

The list of supported customer enterprise application IAP's is stored in the List of Values (LOV) table. The following entries are some sample IAP names List as shown in Table 1.

TABLE 1

| LOV Type | Display Name | Language Independent Value |
| --- | --- | --- |
| UAN_IAP_NAME | Sync Account | Sync Account |
| UAN_IAP_NAME | Sync Contact | Sync Contact |
| UAN_IAP_NAME | Sync Opportunity | Sync Opportunity |

OnDemand Enterprise Application Execution Business Service

A Business Service is created that takes in customer id and IAP name as input and returns true if the IAP has been enabled for the specific customer, as illustrated in Table 2. The business service can be cached and shared across all user sessions. The Administrative Configuration is not expected to change regularly.

TABLE 2

| | |
|---|---|
| Business Service Name | OnDemand UAN Execution Business Service |
| Method Name | IsUanIapEnabled |
| Input Arguments | string CompanyId, string IapName |
| Return Type | boolean |
| Description | Return TRUE if CompanyId has enabled IapName |

Design for Real-time IAP Execution

IAP execution occurs in real-time. When a user commits a record on a BusComp that has an associated IAP, the workflow for the IAP is triggered. The Start step of the workflow is configured to fire upon a BusComp WriteRecord event. If the call to MQ fails, the record will still be committed, and the user will see a dialog box saying that there was an error and the error will be logged to the OnDemandObjMgr log file.

Deletion in OnDemand system is built such that when a user chooses to "delete" a record, the record is actually updated such that the Deleted Flag is set to TRUE. Certain enterprise application IAP's are not built for deletion. They are built for data insertion and synchronization. Thus, there is a step in the IAP to explicitly check if the Delete Flag has been updated. If the Delete Flag has been updated, then it indicates that the user tried to delete or undelete the record. Such an action is not be passed to UAN.

OnDemand ASI's

The OnDemand Message (record) that is sent to the Integration Server contains the information returned from an ASI. An ASI consists of a Business Service, which in turn interacts with an Integration Object. An Integration Object contains Integration Object Components which map to Business Components.

OnDemand has placeholder fields for customers so that customers may use these placeholder fields for custom data. When modifying an existing IAP, we need to add these placeholder fields to the Integration Object and add them to the IAP transformations. Also, the DUNS Number field needs to be added to the ASI's. DUNS Number will be a joined field from the Organization or Internal Division BusComp. The DUNS Number is used by the B2B server to route the message to a URL that a customer has specified.

OnDemand Custom Fields

The OnDemand system provides custom fields in the business components used in the OnDemand system. Such custom fields can be used by customers to store data that is not in the existing data model. The OnDemand system is configurable to allow a customer to activate selected custom fields. The OnDemand Administrative Application contains a view where an Administrator activates/inactivates the custom fields for a BusComp. The alternative is to build a business service that can return a field mask that only contains active custom fields. The input to the business service method would be Integration Object Name and Customer Id and the output would be this field mask.

Mapping from OnDemand ASI to a Customer Enterprise Application Object

The OnDemand ASI contains some number of custom fields, up to a pre-determined maximum number of fields. When building the map from OnDemand ASI to the customer enterprise application object, each custom field is mapped. The enterprise application object will have a new child structure, ListOfCustomFields. This child structure will contain the fields name, type, and value, for example. The custom fields on the OnDemand ASI is mapped to the list structure. The list structure will also exist in the SPBI document. As examples, Table 3 and Table 4 show an OnDemand message with customizable fields.

TABLE 3

```
<SiebelMessage>
    <ListOfAccountInterface>
        <Account>
            <Name>UAN Account G02</Name>
            <DUNSNumber>1234567890</DUNSNumber>
            <ZText_0>CompanySpecificText</ZText_0>
            <ZNum_11>45</ZNum_11>
        </Account>
    </ListOfAccountInterface>
</SiebelMessage>
```

TABLE 4

```
<listOfOrg>
    <org>
        <baseData>
            <name>UAN Account G02</name>
            <dunsNumber>1234567890</dunsNumber>
        </baseData>
        <listOfCustomField>
            <customField>
                <name>ZText_0</name>
                <type>Text</type>
                <value>CompanySpecificText</value>
            </customField>
            <customField>
                <name>ZNum_11</name>
                <type>Number</type>
                <value>45</value>
            </customField>
        </listOfCustomField>
    </org>
</listOfOrg>
```

Default Owner/Record Owner Assignment

In the OnDemand system, most objects have an Owner field exposed. Accounts and Contacts can be assigned Owners. Many of the child objects, such as Activities, also have the Owner field exposed. When sending a message out of OnDemand, the OnDemand ASI will expose the Owner Alias. Owner Alias is specified by the Host Administrator or Company Administrator when new users are created. The Owner Alias must exist in the Enterprise System as a user.

For inbound requests into OnDemand, if there is an Owner Alias specified, UAN will attempt to set the Owner of the record to this Owner Alias. If the Owner Alias is not a valid user, then the Default Owner will be used. The Default Owner is specified per company per IAP in the Company Administration View.

OnDemand customers have a choice as to how they would like to implement record ownership. The Owner Alias is passed directly from one system to another, so the Owner Alias used must be specified in both systems.

All Enterprise Users Exist in OnDemand and All OnDemand Users Exist in the Enterprise This approach would be used if Opportunity records were being passed back and forth between OnDemand and the Enterprise and it was important to always reflect the current Owner of the record, regardless of whether the Owner is an OnDemand user or Enterprise user.

For outbound communication from OnDemand, an OnDemand User could update the Owner to an Enterprise User, so that when the Opportunity record reaches the Enterprise, the record already has the correct Owner. Alternatively, the Opportunity record could be assigned to an OnDemand User, and the Owner will be reflected correctly in the Enterprise because the OnDemand User has been configured with a valid username.

For inbound communication into OnDemand, an Enterprise User could send an Opportunity record into OnDemand with either an Enterprise User or an OnDemand User as the owner.

This approach provides the most flexibility, but there is additional overhead for the Customer to create users in OnDemand for all Enterprise Users that could be possible Owners in OnDemand. The typical usage for this scenario is a small division of users using OnDemand, while the parent corporation uses the Enterprise. Since everyone is working in the same company, ownership of Opportunities should be accurately reflected on both systems.

All OnDemand Users Exist in the Enterprise and no Enterprise Users Exist in OnDemand For outbound communication from OnDemand, OnDemand sends an OnDemand User as the Owner of the record. This can be passed through directly to the Enterprise and the record will have an OnDemand User as the Owner in the Enterprise.

For inbound communication into OnDemand, before sending to OnDemand, an OnDemand User needs to be specified as an Owner. This can be accomplished manually or by using Assignment Manager. Rules can be built to assign the record a proper OnDemand User. While the record resides in the Enterprise, it could actually have an Enterprise User as Owner. However, as mentioned, before sending the record out to OnDemand, a proper OnDemand User must be specified as the Owner.

This scenario could be used in the case of a small division of users within the company using OnDemand and the parent corporation using the Enterprise. However, the records may not be completely in sync because the Owners could be different in both systems. This scenario should be used if synchronizing the Owner field is not important to the customer.

OnDemand Users Only Exist in OnDemand and Enterprise Users Only Exist in the Enterprise This scenario would be used when one trading partner is using OnDemand, while another trading partner is using an Enterprise system. These 2 partners are in totally different companies. When the OnDemand User wants to send an Opportunity to the other partner using the Enterprise, the OnDemand User understands that it will be reassigned to someone in that partner organization. In this case, the Owner field only has context from within one of the partner organizations.

For outbound communication out of OnDemand, the Owner Alias will be sent, but it will be ignored when the record reaches the Enterprise. The record will be assigned to an Enterprise User most likely using the Assignment Manager.

For inbound communication into OnDemand, the Owner Alias is not be specified. By not specifying the owner alias, if the record is an existing record in OnDemand, the current value for the Owner Alias will be preserved. If this is a new record, then the Default Owner will be used.

SPBI Objects

Before sending a message to a customer via the B2B server, the message is transformed from an OnDemand message to a SPBI Object. According to certain embodiments, the OnDemand message is first transformed to an enterprise application common object and then to an SPBI Object. An SPBI Object is a business document that can be transported via a B2B server. The SPBI Object is B2B standard independent. The SPBI object can be sent via the RosettaNet protocol, AS/2 protocol, or any other protocol for communication between B2B Servers. The SPBI Object contains envelope information such as toRole, fromRole, and documentIdentifier to wrap around a payload. This envelope information is in addition to any headers that are specifies as part of a B2B standard. It is the job of the developer to create the xsd file for the SPBI object.

Role of the Integration Server

The role of the Integration Server is to perform the transformations between the OnDemand Message and SPBI Object. The OnDemand Workflow will invoke a transport business service that sends a message to the Integration Server. After the transformations, the SPBI Object is to be sent to the B2B Server.

When OnDemand receives data from the OnPremise system (customer environment), the Integration Server or B2B server in the OnDemand system will be set up with an adapter listening for messages posted by the B2B Server. This SPBI message will be transformed to an OnDemand Message via SPBI-to-OnDemand transformations. After the transformations are complete, the OnDemand Message will be posted to the OnDemand Server.

Echoing

Assume that there is a bidirectional Sync Account from OnDemand to the Enterprise system. A particular account record exists in both systems. If an OnDemand user and an Enterprise user both attempt to update the record and sync with the other system, then the following occurs.

OnDemand will always echo back requests from the Enterprise system. In this case, whichever update that occurred last on the OnDemand system wins. If the OnDemand user updates the record after OnDemand received the Enterprise message, then the OnDemand user wins. Otherwise the Enterprise user wins. This is because the OnDemand user update will be overwritten with the Enterprise user update because the Enterprise user update got to OnDemand last. In any case, data will always be in sync between OnDemand and the Enterprise system.

AS/2

AS/2 is a protocol for communication and is normally used for EDI documents. However, AS/2 can be used for sending any XML data. AS/2 includes specifications for non-repudiation and security, but does not contain specifications for the business documents that can be transferred. Documents can be sent securely via HTTPS. AS/2 has its own headers. An AS/2 transaction includes initial message delivery and an explicit acknowledgement (also known as an MDN). The MDN is sent after the receiver has unpackaged the message, validated the contents, and verified the authenticity of the sender. An AS/2 message is packaged using MIME or S/MIME. Within an AS/2 message, there are different levels of security. The payload can be encrypted with one digital certificate. A digital signature from the sender can be encrypted with a different digital certificate. The AS/2 protocol has been implemented by most B2B Servers and is widely used in the retail industry.

Role of the B2B Server

When OnDemand is sending records to the enterprise system, the B2B Server is used to send the SPBI Object out to a customer environment. The B2B Server itself supports reading the destination information for an SPBI Object and sending the message to the correct customer. The OnDemand administrator configures the B2B Server to includes a list of all valid customers. Each customer is configured with a destination URL. The destination URL will be the URL for the customer B2B Server that is listening for messages. For example, the DUNS Number can be used to uniquely identify the different customers. The particular URL used must access a port that has been opened on the customer firewall.

When OnDemand is receiving records from the Enterprise system (from OnPremise system), the B2B server receives an SPBI Object from a customer on a port that has been opened up in the firewall. The B2B server is a stand-alone component that is able to listen on a port without the aid of a Web Server.

The B2B server then checks to make sure that this customer is on the list of valid customers in order to execute the transaction detailed in the SPBI Object. Once the validation occurs, the SPBI Object is passed on to the Integration Server or the integration component of the B2B server so that it can be transformed to an OnDemand Message and sent to the OnDemand server.

Communication between the B2B Server and the Integration Server can be via any mechanism the vendor supports. Tibco uses their proprietary Rendezvous messaging system to send messages between the B2B Server and the Integration Server. IBM uses JMS to send messages between the B2B Server and the Integration Server.

Background on DUNS Number

A DUNS Number is a 9-digit unique identifier issued by Dun and Bradstreet. A DUNS Number is free and all a small company would have to do is fill out a short request form at http://www.dnb.com. Different divisions within an organization typically have unique DUNS Numbers.

Error Handling

Within the Hosted Environment and the Enterprise environment, there are different places that an error can occur. In general, the error will be logged to an error log and sent to the OnPremise B2B server.

The only error message that an OnDemand User would receive is if the message could not be posted to the MQSeries Queue. When this happens, the user will get an error message such as: "An error has occurred. Integration Request failed because the MQSeries Server is down. Please contact the System Administrator."

When an error occurs in the Integration Server or B2B Server, the error message is logged to an error log. Ideally, the Host Administrator would also receive an email message with the error. This scenario holds true for outbound requests out of OnDemand and inbound requests into OnDemand In the customer environment, errors can be handled similarly. If there is an error in the Customer B2B Server, an e-mail is be sent to the B2B Server Administrator. The same applies to inbound messages into the Enterprise. For outbound messages out of OnDemand, if the request is synchronous, then the user will receive a popup error message if there is an error sending the request out of the B2B Server.

OnDemand Server-to-Integration Server Communication

Communication between the OnDemand Server and the Integration Server occurs using MQSeries. A main selling point for MQSeries is persistent storage. With MQSeries in place, the OnDemand Server first posts the request to an MQSeries queue. If the Integration Server is down, then the request will sit in the queue until the Integration Server is back online. Also, after MQSeries receives the request, it is stored to the hard drive. Thus, if the MQSeries crashes, the request is not lost. The same logic applies when OnDemand is receiving messages. The Integration Server will post a request to the MQSeries queue and the OnDemand server reads requests from the queue. If the OnDemand system is down, then the request will wait in the queue until the server comes back online. The MQSeries Server will reside on the same machine as the OnDemand Server.

The MQSeries Server can be configured to enable remote queues. A remote queue is a pointer to another queue sitting on another machine. For outbound requests from the Object Manager, the Object Manager will be set up to post to a queue on the local MQSeries Server. This queue will be a remote queue, so the message is forwarded to a central MQSeries Server. When configuring the MQSeries Adapter on the ICS Server, the adapter will point to the central MQSeries Server as the host and refer to a local queue on that machine.

In MQSeries Server Software, multiple machines can form a Queue Manager Cluster. Each of the machines will contain the same local queue. The ICS Server will post requests to a Gateway MQSeries Server and this Gateway Server will distribute the request to the appropriate machine within the cluster.

The embodiments are not limited to the MQSeries. Any suitable persistent queue may be used and it may vary from implementation to implementation.

B2B Server-to-B2B Server Communication

The AS/2 Protocol has reliability built into the architecture. The specification states that if communication to the destination party fails, then the transaction must be retried a specific number of times. The number of maximum retries is configurable on the B2B Server.

Security Between the Integration Server and OnDemand Server

The interaction between the OnDemand Server and Integration Server is considered to be a secure form of communication. Security should be enforced by the OnDemand Server with respect to which customers are authorized to run IAP's. It is the responsibility of the OnDemand Server to determine which customers can run IAP's. Within a customer's organization, depending upon the triggering mechanism, every employee within the customer organization can run an IAP in the OnDemand Server.

Security with respect to the interaction between the Integration Server and the OnDemand Server is about visibility. One customer should not be able to see or access another customer's data. When OnDemand is for sending data to the customer environment, security is not a concern. A user would have to log in using the user's own username and password before being able to trigger an IAP. When the IAP request reaches the Integration Server, customer organization information is imbedded in the message and cannot be modified. The message will be routed to the organization specified in the message.

We claim:

1. A method comprising:
a web server transmitting graphical user interface (GUI) data to a computer system, wherein the web server is contained in a hosting center;
the hosting center receiving user data that was entered into one or more fields of a GUI that was displayed by the computer system;
the hosting center storing the received user data prior to further transmission thereof;
the hosting center transmitting the user data to first and second servers via the Internet, wherein the first server is coupled to a first intranet, and wherein the second server is coupled to a second intranet;
synchronizing said user data transmitted to the first server with application data stored in a first memory; and
synchronizing said user data transmitted to the second server with application data stored in a second memory;
said hosting center receiving updated data from the first server via the Internet, wherein the updated data corresponds to said user data; and
the hosting center synchronizing said updated data received from the first server with said user data received from the computer system.

2. The method of claim 1, wherein said second intranet is separate from the first intranet.

3. The method of claim 1, further comprising:
at said hosting center, converting said user data to a standards independent format; and
after converting said user data, sending said converted user data to said first server via the Internet.

4. The method of claim 3, further comprising: the first server converting said user data from said standards independent format to a first format.

5. The method of claim 1, further comprising: after the hosting center synchronizes said updated data with said user data, the hosting center then echoing said synchronized updated data at said hosting center back to said first server via the internet.

6. The method of claim 1, further comprising: using a secure connection for communication between said hosting center and said first server.

7. The method of claim 1, further comprising: using encryption algorithms to encrypt communications between said hosting center and said first server.

8. The method of claim 1, further comprising: using digital certificates for authentication of users who send communications between said hosting center and said first server.

9. The method of claim 1, further comprising: the hosting center using a data transport system that includes a persistent queue for queuing said user data for sending to said first server and for queuing data received from said first server.

10. The method of claim 1, further comprising: the hosting center using an error log for logging errors that occur on said hosting center; and
the hosting center sending an email message regarding said errors to an administrator of said hosting center.

11. The method of claim 1, further comprising: the hosting center using an error log for logging errors that occur on the first intranet; and
sending an email message regarding said errors to an administrator of said first intranet.

12. A computer-readable non-transitory medium carrying instructions, wherein a method is implemented in response to executing the instructions, the method comprising:
a web server transmitting GUI data to a computer system, wherein the computer system displays a GUI in response to receiving the GUI data, wherein the web server is contained in a hosting center;
the web server receiving user data from the computer system, wherein the user data was entered into one or more fields of the displayed GUI; transmitting the user data to first and second servers coupled to first and second intranets via the Interact;
synchronizing said user data transmitted to the first server with application data stored in a first memory;
synchronizing said user data transmitted to the second server with application data stored in a second memory;
said hosting center receiving updated data from the first server via the Internet, wherein the updated data corresponds to said user data; and
the hosting center synchronizing said updated data received from the first server with said user data received from the computer system.

13. The computer-readable medium of claim 12, wherein the method further comprises:
converting said user data to a standards independent format; and
sending said converted user data to said first server via the Internet.

14. The computer-readable medium of claim 13, wherein the method further comprises:
converting said user data from said standards independent format to a first format.

15. The computer-readable medium of claim 12, wherein the method further comprises:
echoing said synchronized updated data back to said server via the Internet.

16. A system for providing a hosted solution, the system comprising:
a hosting center comprising a web server, wherein the web server is configured to transmit graphical user interface (GUI) data to a computer system and configured to receive user data from the computer system in response to transmitting the GUI data to the computer system; and
a first server coupled to a first intranet and in data communication with said hosting center via the Internet;
a second server coupled to a second intranet and in data communication with said hosting center via the Internet;
wherein said hosting center is configured to store the received user data, and to transmit the stored user data to said first and second servers via the Internet for subsequent synchronization of the user data with first and second application data stored in first and second memories, respectively,
said hosting center is configured to receive updated data from the first server via the Internet, wherein the updated data corresponds to said user data; and
said hosting center is configured to synchronize said updated data received from the first server with said user data received from the computer system.

17. The system of claim 16, further comprising:
a data transport system contained in the hosting center that comprises a persistent queue for queuing the user data and data received from said first server.

18. The system of claim 16, wherein said hosting center and said first server are adapted for supporting secure communication protocols for communications therebetween.

19. The system of claim 16, wherein said hosting center and said first server comprise encryption algorithms to encrypt communications therebetween.

20. The system of claim 16, wherein said hosting center and said first server are adapted to support use of digital certificates for authentication of users who send communications therebetween.

21. The computer-readable medium of claim 12, wherein the method further comprises:
determining whether a user is authorized to send said user data to said hosting center.

22. The method of claim 1 wherein said hosting center is part of an enterprise application system, said user data entered into the one or more fields of a GUI comprises data within an enterprise application in said enterprise application system, and
said synchronizing comprises synchronizing the user data within an enterprise application with enterprise applications in the enterprise application system.

* * * * *

UNITED STATES PATENT AND TRADEMARK OFFICE
CERTIFICATE OF CORRECTION

| | | |
|---|---|---|
| PATENT NO. | : 7,899,907 B2 | Page 1 of 2 |
| APPLICATION NO. | : 11/026565 | |
| DATED | : March 1, 2011 | |
| INVENTOR(S) | : Tse et al. | |

It is certified that error appears in the above-identified patent and that said Letters Patent is hereby corrected as shown below:

In column 1, line 62, after "embodiments" insert -- . --.

In column 2, line 30, delete "bidirectional" and insert -- bi-directional --, therefor.

In column 2, line 54, delete "onDemand" and insert -- OnDemand --, therefor.

In column 5, line 16, delete "inputing" and insert -- inputting --, therefor.

In column 10, line 22, delete "bidirectional" and insert -- bi-directional --, therefor.

In column 11, line 40, after "OnDemand" insert -- . --.

In column 12, line 59, in Claim 1, after "memory;" delete "and".

In column 13, line 8-10, in Claim 4, delete "4. The method of claim 3, further comprising: the first server converting said user data from said standards independent format to a first format." and insert
-- 4. The method of claim 3, further comprising:
the first server converting said user data from said standards independent format to a first format. --,
therefor. (Indentation Error)

In column 13, line 11-15, in Claim 5, delete "The method of claim 1, further comprising: after the hosting center synchronizes said updated data with said user data, the hosting center then echoing said synchronized updated data at said hosting center back to said first server via the internet." and insert -- The method of claim 1, further comprising: after the hosting center synchronizes said updated data with said user data, the hosting center then echoing said synchronized updated data at said hosting center back to said first server via the internet. --, therefor. (Indentation Error)

In column 13, line 15, in Claim 5, delete "internet." and insert -- Internet. --, therefor.

Signed and Sealed this
Eleventh Day of October, 2011

David J. Kappos
*Director of the United States Patent and Trademark Office*

CERTIFICATE OF CORRECTION (continued)
U.S. Pat. No. 7,899,907 B2

In column 13, line 16-18, in Claim 6, delete "The method of claim 1, further comprising: using a secure connection for communication between said hosting center and said first server." and insert -- The method of claim 1, further comprising:
using a secure connection for communication between said hosting center and said first server. --, therefor. (Indentation Error)

In column 13, line 19-21, in Claim 7, delete "7. The method of claim 1, further comprising: using encryption algorithms to encrypt communications between said hosting center and said first server." and insert -- 7. The method of claim 1, further comprising: using encryption algorithms to encrypt communications between said hosting center and said first server. --, therefor. (Indentation Error)

In column 13, line 22-24, in Claim 8, delete "8. The method of claim 1, further comprising: using digital certificates for authentication of users who send communications between said hosting center and said first server." and insert -- 8. The method of claim 1, further comprising: using digital certificates for authentication of users who send communications between said hosting center and said first server. --, therefor. (Indentation Error)

In column 13, line 25-28, in claim 9, delete "9. The method of claim 1, further comprising: the hosting center using a data transport system that includes a persistent queue for queuing said user data for sending to said first server and for queuing data received from said first server." and insert -- 9. The method of claim 1, further comprising:
the hosting center using a data transport system that includes a persistent queue for queuing said user data for sending to said first server and for queuing data received from said first server. --, therefor. (Indentation Error)

In column 13, line 29-33, in Claim 10, delete "10. The method of claim 1, further comprising: the hosting center using an error log for logging errors that occur on said hosting center; and the hosting center sending an email message regarding said errors to an administrator of said hosting center." and insert -- 10. The method of claim 1, further comprising: the hosting center using an error log for logging errors that occur on said hosting center; and the hosting center sending an email message regarding said errors to an administrator of said hosting center. --, therefor. (Indentation Error)

In column 34-38, in Claim 11, delete "11. The method of claim 1, further comprising: the hosting center using an error log for logging errors that occur on the first intranet; and sending an email message regarding said errors to an administrator of said first intranet." and insert --11. The method of claim 1, further comprising: the hosting center using an error log for logging errors that occur on the first intranet; and sending an email message regarding said errors to an administrator of said first intranet. --, therefor. (Indentation Error)

In column 13, line 50, in Claim 12, delete "Interact;" and insert -- Internet; --, therefor.

In column 14, line 19, in Claim 16, after "system;" delete "and".